US011402461B2

(12) United States Patent
Koyama et al.

(10) Patent No.: US 11,402,461 B2
(45) Date of Patent: Aug. 2, 2022

(54) SOUND SOURCE POSITION ESTIMATION DEVICE AND WEARABLE DEVICE

(71) Applicant: Sony Corporation, Tokyo (JP)

(72) Inventors: Yuichiro Koyama, Tokyo (JP); Toshiyuki Sekiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 806 days.

(21) Appl. No.: 16/330,960

(22) PCT Filed: Aug. 2, 2017

(86) PCT No.: PCT/JP2017/028102
§ 371 (c)(1),
(2) Date: Mar. 6, 2019

(87) PCT Pub. No.: WO2018/051663
PCT Pub. Date: Mar. 22, 2018

(65) Prior Publication Data
US 2019/0250245 A1 Aug. 15, 2019

(30) Foreign Application Priority Data
Sep. 13, 2016 (JP) .............................. JP2016-178745

(51) Int. Cl.
*G01S 3/80* (2006.01)
*H04R 3/00* (2006.01)
(Continued)

(52) U.S. Cl.
CPC ................. *G01S 5/28* (2013.01); *G01S 5/30* (2013.01); *H04R 1/406* (2013.01); *H04R 3/005* (2013.01);
(Continued)

(58) Field of Classification Search
CPC .. G01S 5/28; G01S 5/30; H04R 1/406; H04R 3/005; H04R 1/40; H04R 2201/401; H04R 2430/20
(Continued)

(56) References Cited

U.S. PATENT DOCUMENTS

2003/0012394 A1 1/2003 Lee
2004/0032796 A1 2/2004 Chu et al.
(Continued)

FOREIGN PATENT DOCUMENTS

CN 105529033 A 4/2016
JP 2003-535529 A 11/2003
(Continued)

OTHER PUBLICATIONS

International Written Opinion and English translation thereof dated Oct. 24, 2017 in connection with International Application No. PCT/JP2017/028102.
(Continued)

*Primary Examiner* — Ammar T Hamid
(74) *Attorney, Agent, or Firm* — Wolf, Greenfield & Sacks, P.C.

(57) ABSTRACT

[Object] To make it possible to estimate the position of a sound source resulting from a wearing displacement, even in the case where the wearing displacement occurs in a wearable device.
[Solution] A sound source position estimation device according to the present disclosure includes: a spectrum acquisition unit configured to acquire a frequency spectrum of a sound source on the basis of a sound obtained by a plurality of microphones provided for a ring-like wearable device; a distance computing unit configured to compute respective distances from the plurality of microphones to the sound source on the basis of the frequency spectrum; and a
(Continued)

sound source position computing unit configured to, approximating the ring-like wearable device to a circle and assuming that the sound source is located on a cylindrical surface including the ring-like wearable device, obtain an intersection between the cylindrical surface and spherical surfaces whose radii are the respective distances to compute a position of the sound source.

14 Claims, 7 Drawing Sheets

(51) Int. Cl.
G01S 5/28 (2006.01)
G01S 5/30 (2006.01)
H04R 1/40 (2006.01)

(52) U.S. Cl.
CPC .......... *H04R 1/40* (2013.01); *H04R 2201/401* (2013.01); *H04R 2430/20* (2013.01)

(58) Field of Classification Search
USPC .............................. 367/118, 117; 381/122, 92
See application file for complete search history.

(56) References Cited

U.S. PATENT DOCUMENTS

| 2013/0080168 A1* | 3/2013 | Iida ........................ G01S 5/183 |
| | | 704/E17.001 |
| 2016/0165340 A1 | 6/2016 | Benattar |
| 2017/0195767 A1 | 7/2017 | Kim et al. |
| 2018/0317005 A1 | 11/2018 | Sekiya et al. |

FOREIGN PATENT DOCUMENTS

| JP | 2010-193344 A | 9/2010 |
| JP | 2013-072977 A | 4/2013 |
| WO | WO 2016/063587 A1 | 4/2016 |
| WO | WO 2017/065092 A1 | 4/2017 |

OTHER PUBLICATIONS

International Preliminary Report on Patentability and English translation thereof dated Mar. 28, 2019 in connection with International Application No. PCT/JP2017/028102.
Extended European Search Report dated Jun. 28, 2019 in connection with European Application No. 17850569.9.
International Search Report and English translation thereof dated Oct. 24, 2017 in connection with International Application No. PCT/JP2017/028102.

\* cited by examiner

● : MOUTH COORDINATES
(PROJECTED ON ROTARY PLANE FOR ILLUSTRATION)

○ : MICROPHONE COORDINATES

● : MOUTH COORDINATES
(PROJECTED ON ROTARY PLANE FOR ILLUSTRATION)

○ : MICROPHONE COORDINATES

- ● : MOUTH COORDINATES (PROJECTED ON ROTARY PLANE FOR ILLUSTRATION)
- ○ : MICROPHONE COORDINATES (EXEMPLARY ARRANGEMENT)
- d : DIAMETER OF NECK BAND

SOUND SOURCE POSITION ESTIMATION DEVICE AND WEARABLE DEVICE

CROSS REFERENCE TO RELATED APPLICATIONS

This is a U.S. National Stage Application under 35 U.S.C. §371, based on International Application No. PCT/JP2017/028102, filed Aug. 2, 2017, which claims priority to Japanese Patent Application JP 2016-178745, filed Sep. 13, 2016, each of which is hereby incorporated by reference in its entirety.

TECHNICAL FIELD

The present disclosure relates to a sound source position estimation device and a wearable device.

BACKGROUND ART

Conventionally, Patent Literature 1 below, for example, describes a technology that assumes preventing a displacement of a worn position of an ear-hook type earphone device.

CITATION LIST

Patent Literature

Patent Literature 1: JP 2010-193344A

DISCLOSURE OF INVENTION

Technical Problem

Recently, various wearable devices such as a clock-type device and an eyeglass-type device have appeared. These wearable devices cause a position displacement (wearing displacement) with respect to the body during use in some cases.

When a wearing displacement occurs, a trouble occurs in the operation of a wearable device in some cases. In particular, in the case where the wearable device includes a microphone, the wearing displacement may change the position of the microphone with respect to a sound source, and it may become impossible to acquire sound information properly.

The technology described in Patent Literature 1 above assumes preventing a wearing displacement in an ear-hook type earphone device, but does not consider measures for the case where a wearing displacement occurs at all.

Therefore, even in the case where a wearing displacement occurs in a wearable device, it is desired to make it possible to estimate the position of a sound source resulting from the wearing displacement.

Solution to Problem

According to the present disclosure, there is provided a sound source position estimation device including: a spectrum acquisition unit configured to acquire a frequency spectrum of a sound source on the basis of a sound obtained by a plurality of microphones provided for a ring-like wearable device; a distance computing unit configured to compute respective distances from the plurality of microphones to the sound source on the basis of the frequency spectrum; and a sound source position computing unit configured to, approximating the ring-like wearable device to a circle and assuming that the sound source is located on a cylindrical surface including the ring-like wearable device, obtain an intersection between the cylindrical surface and spherical surfaces whose radii are the respective distances to compute a position of the sound source.

In addition, according to the present disclosure, there is provided a wearable device including: an enclosure like a ring, provided with a plurality of microphones; and a sound source position estimation device including a spectrum acquisition unit configured to acquire a frequency spectrum of a sound source on the basis of a sound obtained by the plurality of microphones, a distance computing unit configured to compute respective distances from the plurality of microphones to the sound source on the basis of the frequency spectrum, and a sound source position computing unit configured to, approximating the enclosure to a circle and assuming that the sound source is located on a cylindrical surface including the enclosure, obtain an intersection between the cylindrical surface and spherical surfaces whose radii are the respective distances to compute a position of the sound source.

Advantageous Effects of Invention

According to the present disclosure as described above, even in the case where a wearing displacement occurs in a wearable device, it is possible to estimate the position of a sound source resulting from the wearing displacement.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
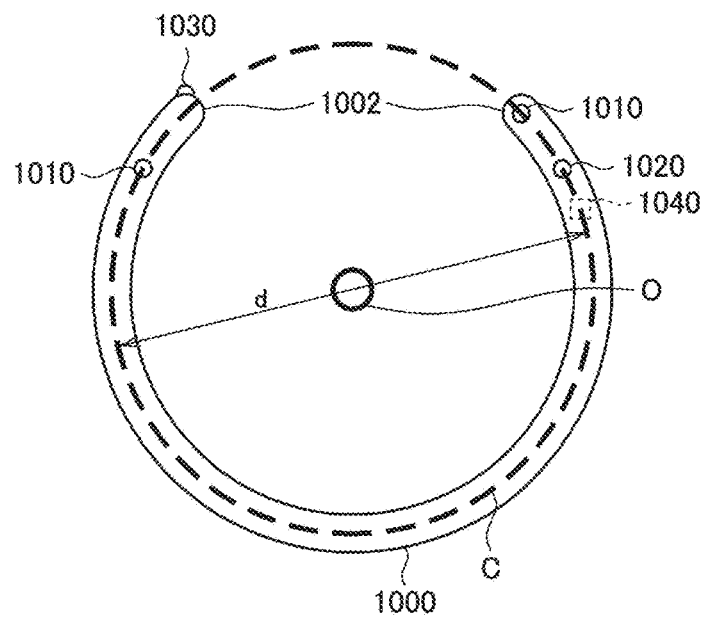
FIG. 1 describes a schematic configuration of a neck band type device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Appearance of neck band according to present embodiment
2. Wearing displacement of neck band type device
3. Computation for specifying sound source position
4. With regard to optimization calculation
5. Configuration example of sound source position estimation device
6. With regard to beam forming processing
7. Setting of inclination and diameter of neck band type device
1. Appearance of Neck Band Type Device According to Present Embodiment First, a schematic configuration of a neck band type device (ring-like device) 1000 according to an embodiment of the present disclosure will be described with reference to FIG. 1. As shown in FIG. 1, the neck band type device 1000 according to the present embodiment has a circular ring shape, and is provided with an opening 1002. A user can wear the neck band type device 1000 around the neck by opening the opening 1002.

The neck band type device 1000 includes a microphone 1010, a speaker 1020, a camera 1030, and a GPS 1040. The neck band type device 1000 acquires sound information about voice of the user by sound recognition, and provides the user with information by producing a sound from the speaker 1020 in accordance with the sound information. In addition, the neck band type device 1000 can acquire image information by image capturing with the camera 1030. In addition, the neck band type device 1000 can also inform the user of information about a recommended place, shop, and the like in accordance with positional information about the user acquired by the GPS 1040.

Figure 2:
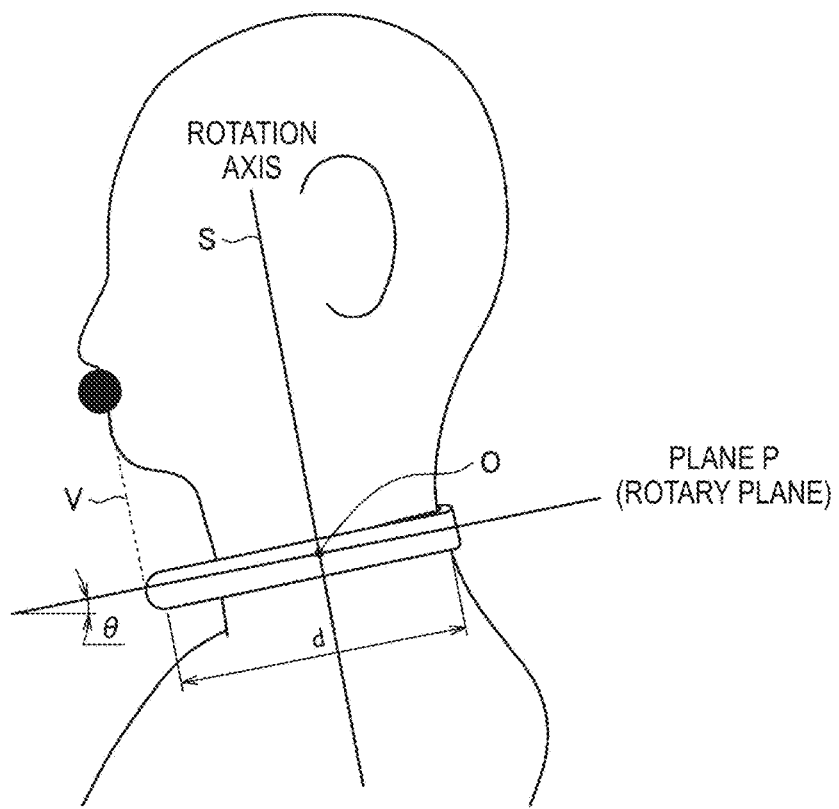
FIG. 2 is a schematic view showing a correct worn state in which the position of an opening is directed to the front of a user.
Figure 3:
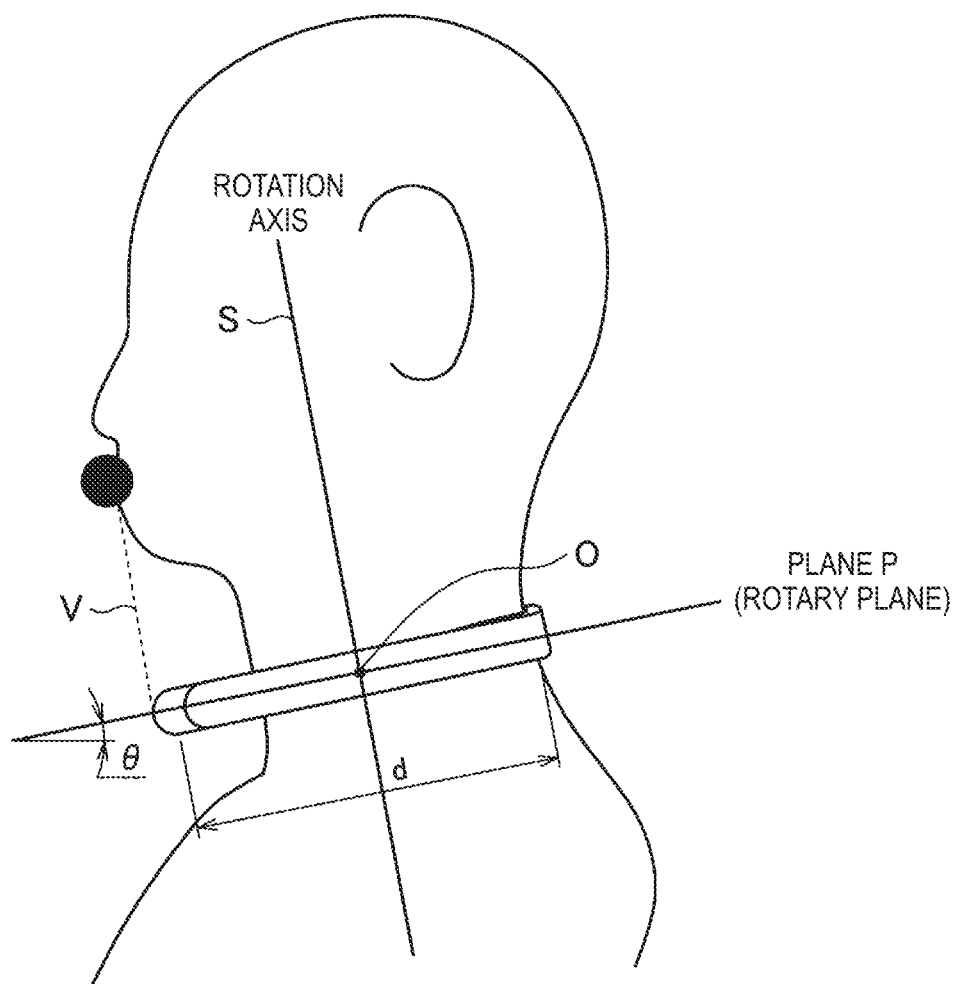
FIG. 3 is a schematic view showing the state in which the opening of the neck band type device has been rotated to this side with respect to FIG. 2, and a wearing displacement has occurred.

Functions of the neck band type device 1000 as described above are achieved in a hands-free manner basically on the basis of an instruction by voice uttered by the user without the user manipulating the neck band type device 1000. Therefore, the microphone 1010 is configured so as to correctly recognize voice of the user.
2. Wearing Displacement of Neck Band Type Device A device not fixed to the user's body, such as the neck band type device 1000, may be brought into the state of being displaced from a reference worn state (such a displacement will be referred to as a "wearing displacement"). FIG. 2 and FIG. 3 are schematic views for describing a wearing displacement. FIG. 2 shows a usual worn time, at which the position of the opening 1002 is directed to the front of the user, and shows a correct worn state. On the other hand, FIG. 3 shows the state in which the opening 1002 of the neck band type device 1000 has been rotated to this side with respect to FIG. 2, and a wearing displacement has occurred.

Although it is possible to perform signal processing of enhancing voice of the user by mounting a plurality of microphones 1010 on the neck band type device 1000, adaptive signal processing such as sequentially estimating transfer characteristics from the mouth of the user to each of the microphones 1010 will be required in the case where a wearing displacement has occurred. Therefore, the present embodiment enables high-performance signal processing even in the case where a wearing displacement has occurred in the neck band type device 1000. Detailed description will be given below.
3. Computation for Specifying Sound Source Position As shown in FIG. 1, the shape of the neck band type device 1000 is a substantially circular shape that follows a circle C. Therefore, the plurality of microphones 1010 mounted on an enclosure of the neck band type device 1000 also exists on the circumference. Accordingly, it may be considered that the wearing displacement shown in FIG. 3 is a rotational movement within a two-dimensional plane P (hereinafter referred to as a rotary plane) in which the neck band type device 1000 extends, and its rotation axis S extends through the center of the circle C made by the neck band type device 1000.

As shown in FIG. 2 and FIG. 3, in the neck band type device 1000 according to the present embodiment, by appropriately selecting an angle θ made by the rotary plane and the horizontal plane at the time of wearing and a diameter d of the neck band type device 1000 (the circle C), a perpendicular V, when drawn from the mouth of the user to the rotary plane, shall intersect with the circle C made by the neck band type device 1000. By creating such a geometric relationship, the perpendicular V and the circle C intersect regardless of the degree of the wearing displacement. A specific setting method and adjustment method for the angle θ and the diameter d will be described later.

Figure 4:
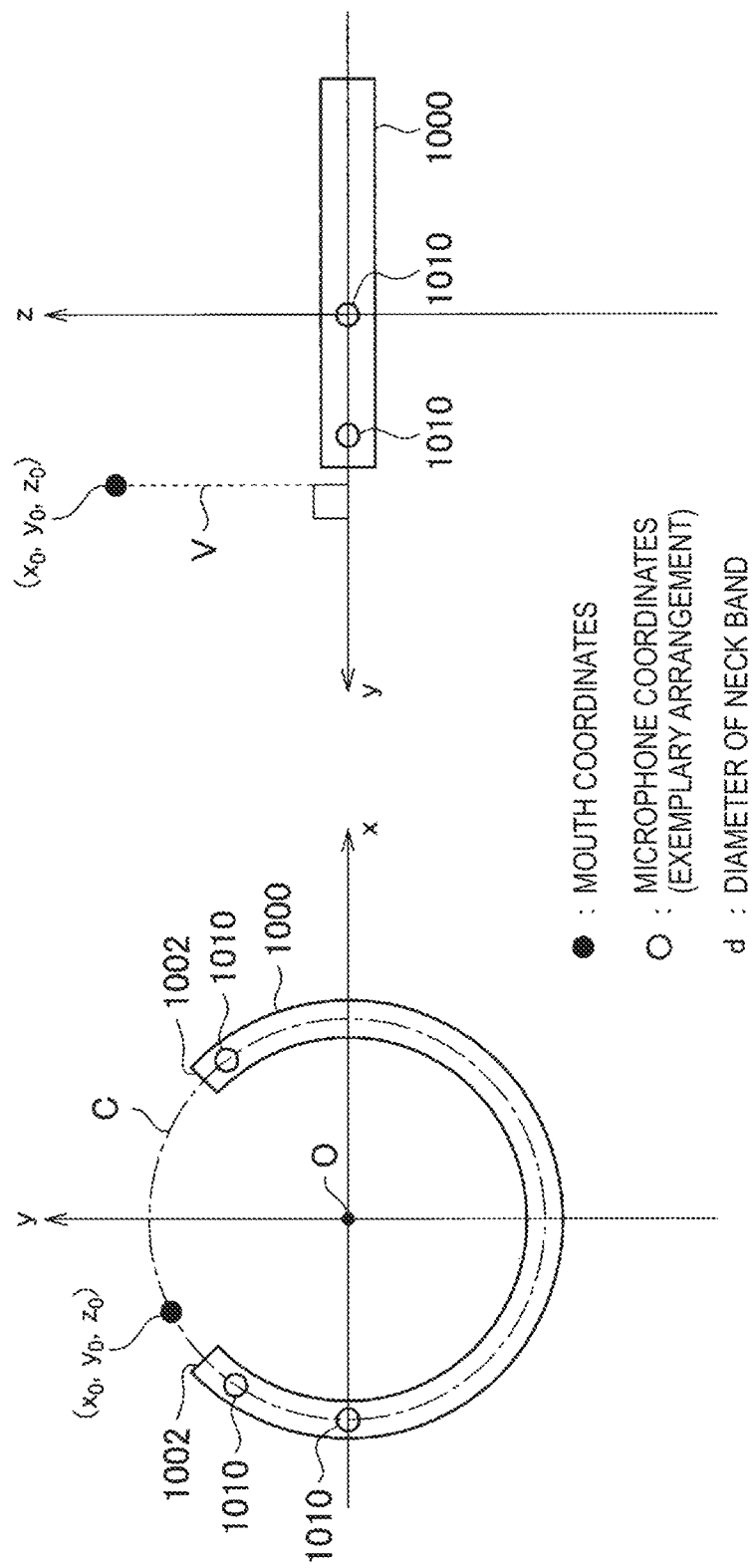
FIG. 4 is a schematic view showing a positional relationship between mouth coordinates ($x_0$, $y_0$, $z_0$) and the neck band type device.

In such a geometric relationship, it is possible to mathematically express the mouth coordinates $(x_0, y_0, z_0)$ of the user as a point on the side surface of a cylinder including the circle C of the neck band type device 1000. FIG. 4 is a schematic view showing the positional relationship between the mouth coordinates $(x_0, y_0, z_0)$ and the neck band type device 1000. In FIG. 4, coordinate axes are defined as being fixed on the neck band type device 1000. In addition, FIG. 4 shows a configuration in which three microphones 1010 are provided.

Since it can be considered that the mouth coordinates $(x_0, y_0, z_0)$ of the user indicate a point on the side surface of the cylinder including the circle C as shown in FIG. 4, Expression (1) below holds.

[Math. 1]

$$x_0^2 + y_0^2 = \left(\frac{d}{2}\right)^2 \quad (1)$$

Figure 5:
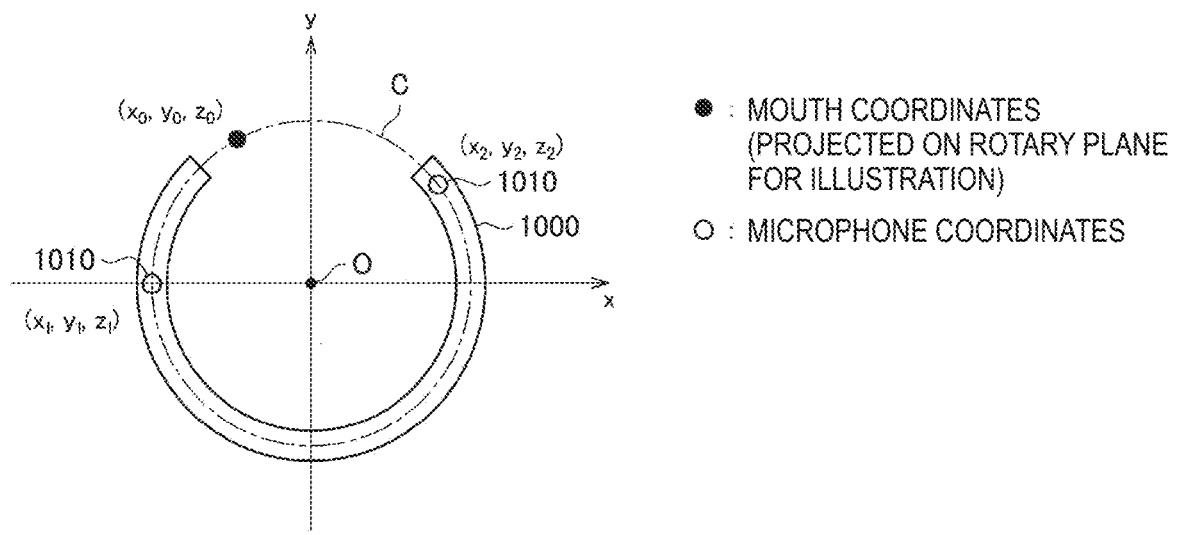
FIG. 5 is a schematic view for describing a technique for obtaining, in the case where two microphones are provided, mouth coordinates ($x_0$, $y_0$, $z_0$) from microphone coordinates ($x_1$, $y_1$, $z_1$) and microphone coordinates ($x_2$, $y_2$, $z_2$) as well as distances $d_1$ and $d_2$ between the mouth coordinates and the respective microphone coordinates.

By using Expression (1), the mouth coordinates $(x_0, y_0, z_0)$ can be obtained from known coordinates (microphone coordinates) of the microphones 1010. FIG. 5 is a schematic view for describing a technique for obtaining, in the case where two microphones 1010 are provided, the mouth coordinates ($x_0$, $y_0$, $z_0$) from microphone coordinates ($x_1$, $y_1$, $z_1$) and microphone coordinates ($x_2$, $y_2$, $z_2$).

Here, assume a sound signal of the user at a time t as s(t). A Fourier transform of s(t) is expressed as s($\omega$), in which $\omega=2\pi f$ is an angular frequency, and f is a frequency. Hereinafter, limiting to a certain narrowband signal, s($\omega$) will be simply be expressed as s, and will be called a frequency spectrum. In FIG. 5, assuming distances between the mouth coordinates ($x_0$, $y_0$, $z_0$) and the respective microphone coordinates as $d_1$ and $d_2$, frequency spectrums $p_1$ and $p_2$ observed in the respective microphones 1010 can be expressed by Expression (2) and Expression (3) below, in which j expresses an imaginary unit, and exp(a) expresses an exponential function of a.

[Math. 2]

$$p_1 = \frac{1}{d_1}\exp\left(-j\omega\frac{d_1}{c}\right)s, \quad (2)$$

$$p_2 = \frac{1}{d_2}\exp\left(-j\omega\frac{d_2}{c}\right)s \quad (3)$$

In addition, if $p_1 \neq p_2$ holds, the distances $d_1$ and $d_2$ are obtained by Expression (4) and Expression (5) below according to the relationship between amplitude ratio and phase difference.

[Math. 3]

$$d_1 = \frac{c(\arg p_2 - \arg p_1)}{\omega\left(1 - \frac{|p_1|}{|p_2|}\right)}, \quad (4)$$

$$d_2 = \frac{c(\arg p_1 - \arg p_2)}{\omega\left(1 - \frac{|p_2|}{|p_1|}\right)} \quad (5)$$

On the other hand, Expression (6) and Expression (7) below hold according to the geographical relationship.

$$d_1^2 = (x_1-x_0)^2 + (y_1-y_0)^2 + z_0^2 \quad (6)$$

$$d_2^2 = (x_2-x_0)^2 + (y_2-y_0)^2 + z_0^2 \quad (7)$$

It is possible to substitute the distances $d_1$ and $d_2$ obtained by Expression (4) and Expression (5) into Expression (6) and Expression (7), and add Expression (1) to solve simultaneous equations. Since Expression (6) and Expression (7) are equations expressing spherical surfaces, and Expression (1) is an equation expressing a cylindrical surface, the mouth coordinates ($x_0$, $y_0$, $z_0$) can be obtained as their intersection.

For calculating a solution, an analytical method may be used, or a numerical method such as the Newton's method may be used. Since two intersections (solutions) exist in some cases, one point is selected assuming that $y_0>0$ in such a case. That is, it is supposed that the wearing displacement falls within ±90 degrees.

Although it is not possible to calculate the mouth coordinates merely by Expression (6) and Expression (7) as described above, the mouth coordinates that cannot be calculated usually can be calculated by using the relationship in Expression (1) specific to the neck band type device 1000 of the present embodiment. In addition, since $z_0$ will not be changed in accordance with the wearing displacement when $z_0$ of the mouth coordinates becomes known once, unknown numbers will then become two with respect to the three equations (Expression (1), Expression (6), and Expression (7)), so that it is possible to calculate $x_0$ and $y_0$ through optimization. Note that a technique for optimization calculation will be described later in detail. In this manner, by treating the mouth coordinates projected on the axis perpendicular to the plane in which the neck band type device 1000 exists as a temporally constant value, the number of estimated parameters can be reduced, and optimization calculation can be performed. Then, by recalculating the distances $d_1$ and $d_2$ from $x_0$ and $y_0$ having been calculated, it is possible to calculate the distances $d_1$ and $d_2$ with higher accuracy. Accordingly, it is possible to significantly improve performance such as beam forming, for example. In addition, since whether or not there is a wearing displacement is known on the neck band type device 1000 side on the basis of the mouth coordinates, it is possible to warn the user that a wearing displacement has occurred by a technique such as producing a sound from the speaker 1020.

Figure 6:
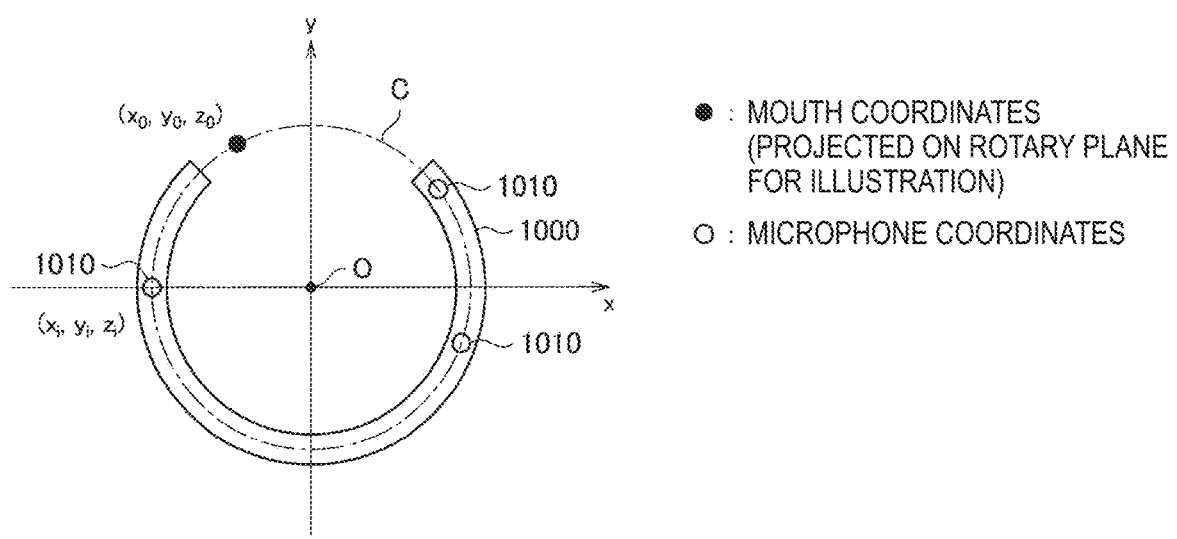
FIG. 6 is a schematic view for describing a technique for obtaining, in the case where more than or equal to three (n) microphones are provided, mouth coordinates ($x_0$, $y_0$, $z_0$) from microphone coordinates ($x_i$, $y_i$, $z_i$) as well as the distance $d_i$ between the mouth coordinates and the respective microphone coordinates.

FIG. 6 is a schematic view for describing a technique for obtaining, in the case where more than or equal to three (n) microphones 1010 are provided, the mouth coordinates ($x_0$, $y_0$, $z_0$) from the microphone coordinates ($x_i$, $y_i$, $z_i$). Note that i=1, . . . , n shall hold.

In FIG. 6, assuming that the distance between the mouth coordinates ($x_0$, $y_0$, $z_0$) and the respective microphone coordinates as $d_i$, a frequency spectrum $p_i$ observed in each of the microphones 1010 can be expressed by Expression (8) below.

[Math. 4]

$$p_i = \frac{1}{d_i}\exp\left(-j\omega\frac{d_i}{c}\right)s \;(i=1,\ldots,n) \quad (8)$$

In addition, Expression (9) and Expression (10) below are obtained according to the relationship between amplitude ratio and phase difference. On this occasion, since the number of equations is larger than the number of $d_i$ desired to be obtained, it is possible to obtain $d_i$ through linear optimization.

[Math. 5]

$$\frac{|p_1|}{|p_i|} = \frac{d_i}{d_1}, \quad (9)$$

$$\arg p_1 - \arg p_i = \frac{\omega}{c}(d_i - d_1) \;(i \neq q) \quad (10)$$

In addition, similarly to the case where there are two microphones 1010, Expression (11) below holds according to the geographical relationship.

$$d_i^2 = (x_1-x_i)^2 + (y_1-y_i)^2 + z_0^2 \quad (11)$$

From the foregoing, unknown numbers are three of $x_0$, $y_0$, and $z_0$, and n+1 equations are obtained, so that the mouth coordinates ($x_0$, $y_0$, $z_0$) can be determined through nonlinear optimization. In addition, by calculating the distance $d_i$ using the values of the obtained mouth coordinates ($x_0$, $y_0$, $z_0$), it is possible to obtain the distance $d_i$ which is more highly accurate.

In optimization calculation, the following errors $\lambda i$ and $\mu i$ shall be included in Expression (9) and Expression (10) (however, excluding the case where i=1).

[Math. 6]

$$|p_1|d_1 - |p_i|d_i = \lambda_i \quad (9)'$$

$$\frac{\omega}{c}(d_1 - d_i) - (\arg p_i - \arg p_1) = \mu_i \quad (10)'$$

Then, in optimization calculation, $d_i$ (i=1, ..., n) that minimizes the following square error is obtained in Expression (9)' and Expression (10)'.

[Math. 7]

$$\sum_{i=2}^{n} (\lambda_i^2 + \mu_i^2)$$

In optimization calculation, the accuracy of distance $d_i$ is improved when the number of equations increases by one. Accordingly, transfer characteristics (steering vector) from the microphones 1010 to the mouth are obtained accurately, so that performance of signal processing such as beam forming is improved. In particular, in the case where n≥3, improvement in accuracy can be expected by performing optimization calculation by the method according to the present embodiment, although, when n=3, optimization calculation cannot be performed since the number of unknown numbers and the number of equations agree. In addition, similarly to the foregoing, the number of unknown numbers decreases when $z_0$ becomes known, so that improvement in accuracy can be expected further.

Figure 7:
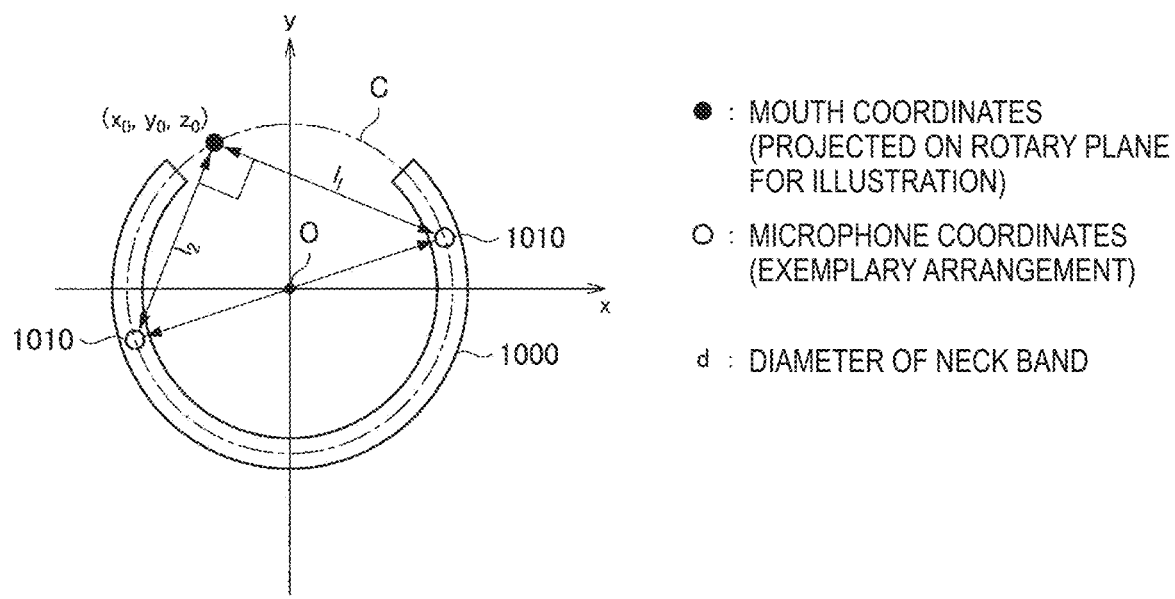
FIG. 7 is a schematic view showing the case where the microphones are located at point symmetric positions.

FIG. 7 is a schematic view showing the case where the microphones 1010 are located at point symmetric positions. Assuming the distances from the two microphones 1010 to the mouth coordinates ($x_0$, $y_0$, $z_0$) as $l_1$ and $l_2$, the relationship in Expression (12) below always holds according to Thales's theorem.

$$l_1^2 + l_2^2 = d^2 \quad (12)$$

Assuming the distances between the mouth coordinates ($x_0$, $y_0$, $z_0$) and the respective microphone coordinates as $d_1$ and $d_2$, Expression (12) can be transformed as Expression (15) below.

$$d_1^2 + d_2^2 = d^2 + 2z_0^2 \quad (13)$$

By using Expression (13) instead of Expression (1) assuming that Expression (13) always holds, the mouth coordinates ($x_0$, $y_0$, $z_0$) can be obtained.

4. With Regard to Optimization Calculation

In optimization calculation in the present embodiment, two methods are considered depending on how to treat Expression (1). Here, the case where more than or equal to three microphones 1010 are arranged at arbitrary positions is considered for generalization.

The first method is optimization with restrictions. In this method, in the case where the shape of the neck band type device 1000 is sufficiently ideal and it is considered that Expression (1) holds without errors, ($x_0$, $y_0$, $z_0$) that minimize a square error of Expression (16) below are obtained using Expression (1) as a restriction condition.

[Math. 8]

$$\sum_{i=1}^{n} \epsilon_i^2 = \sum_{i=1}^{n} [(x_i - x_0)^2 + (y_i - y_0)^2 + z_0^2 - d_i^2]^2 \quad (16)$$

The second method is optimization without restrictions, and Expression (17) and Expression (18) below are set considering that Expression (1) also includes an error in the case where the shape of the neck band type device 1000 does not satisfy the condition sufficiently.

[Math. 9]

$$x_0^2 + y_0^2 = (d/2)^2 + \epsilon_0^2 \quad d_i^2 = (x_i - x_0)^2 + (y_i - y_0)^2 + z_0^2 + \epsilon_i \quad i=1, \ldots, n \quad (19), (20)$$

Then, ($x_0$, $y_0$, $z_0$) that minimize a square error of Expression (19) below are obtained.

[Math. 10]

$$\sum_{i=0}^{n} \epsilon_i^2 \quad (19)$$

5. Configuration Example of Sound Source Position Estimation Device

Figure 8:
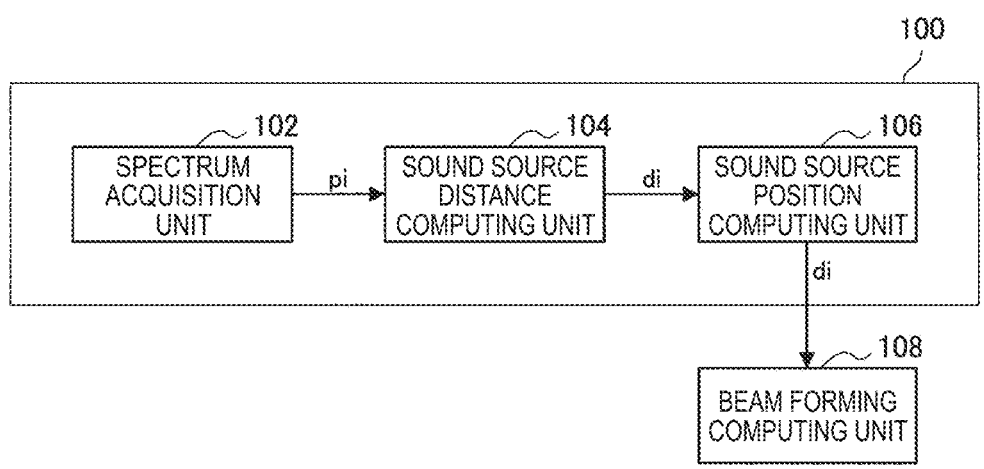
FIG. 8 is a schematic view showing a configuration of a sound source position estimation device 100 that estimates a sound source position in the neck band type device.

FIG. 8 is a schematic view showing a configuration of the sound source position estimation device 100 that estimates the sound source position in the neck band type device 1000 by the computations described above. As shown in FIG. 8, the sound source position estimation device 100 has a spectrum acquisition unit 102, a sound source distance computing unit 104, and a sound source position computing unit 106. The distance $d_i$ calculated by the sound source position computing unit 106 is sent to a beam forming computing unit 108. The spectrum acquisition unit 102 acquires a frequency spectrum pi by subjecting signals observed in the microphones 1010 to AD conversion and performing frequency band division processing. The sound source distance computing unit 104 obtains the distance $d_i$ between the mouth coordinates and the microphone coordinates on the basis of Expression (4) and Expression (5) (or Expression (9) and Expression (10)) described above. The sound source position computing unit 106 computes the mouth coordinates ($x_0$, $y_0$, $z_0$) on the basis of Expression (1), Expression (6), and Expression (7) (or Expression (1) and Expression (11)) described above. In addition, the sound source position computing unit 106 calculates the distance $d_i$ again on the basis of the obtained mouth coordinates ($x_0$, $y_0$, $z_0$) and the microphone coordinates to calculate the distance $d_i$ with higher accuracy. The beam forming computing unit 108 performs beam forming processing on the basis of the distance di calculated again with high accuracy. The sound source position estimation device 100 shown in FIG. 8 is provided in the inside of the neck band type device 1000, whilst the sound source position estimation device 100 may be provided for external equipment (a cloud computer or the like), and necessary parameters may be transmitted from the neck band type device 1000 to the external equipment, and the neck band type device 1000 may receive the sound source position computed on the external equipment side. Each structural element of the sound source position estimation device 100 shown in FIG. 8 can include a circuit (hardware) or a central processing unit such as a CPU and a program (software) for causing this to function. In addition, that program can be stored in a recording medium such as a memory.

6. With Regard to Beam Forming Processing

Figure 9:
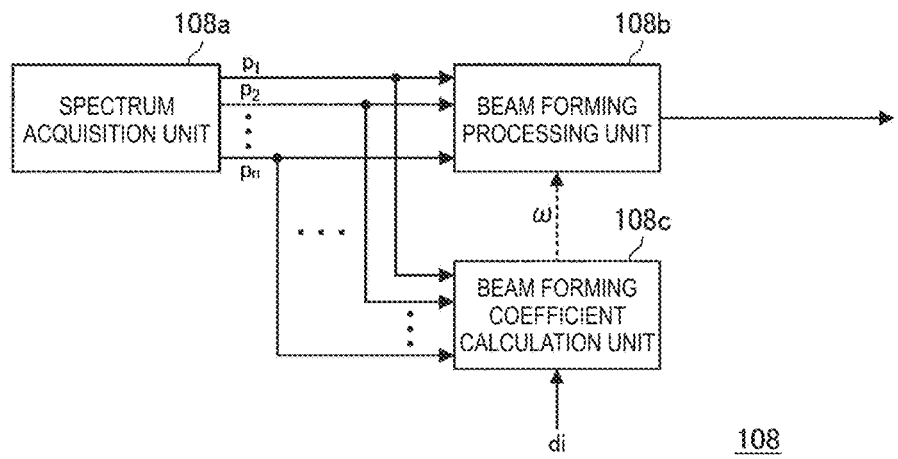
FIG. 9 is a schematic view showing a configuration of a beam forming computing unit.

FIG. 9 is a schematic view showing a configuration of the beam forming computing unit 108. The beam forming computing unit 108 has a spectrum acquisition unit 108a, a beam forming processing unit 108b, and a beam forming coefficient calculation unit 108c. Note that the spectrum acquisition unit 108a is a structural element having an identical function to the spectrum acquisition unit 102.

Since the distance $d_i$ between the mouth coordinates ($x_0$, $y_0$, $z_0$) and microphone coordinates ($x_i$, $y_i$, $z_i$) of each of the microphones 1010 can be obtained with high accuracy as described above, improvement in performance of beam forming processing in the beam forming computing unit 108 can be achieved as will be described below. First, a vector (steering vector) as in Expression (20) below in which transfer functions from the mouth to the respective microphones 1010 are aligned is created using the obtained distance $d_i$. However, in Expression (20), c is the sound velocity, and n is the number of the microphones 1010. In addition, the superscript T expresses a transposition.

[Math. 11]

$$\alpha = [e^{-j\omega d_1/c}, \ldots, e^{-j\omega d_n/c}]^T \quad (20)$$

In the case of multiplying a vector p (see Expression (21)) in which frequency spectrums in the respective microphones 1010 are aligned by a filter w to suppress signals other than a target signal, it is possible to obtain the filter w from Expression (22) below as a solution of the following optimization problem that minimizes output power under a restraint that a target sound source does not change.

[Math. 12]

subject to $w^H a = 1$ $$\min_w E[|w^H p|^2] \quad (22)$$

However, $E[\alpha]$ is an expected value of $\alpha$, and the superscript H expresses a conjugate transposition. A solution of this optimization problem can be expressed as in Expression (24) below using R (see Expression (23)) which is a covariance matrix of p.

[Math. 13]

$$R = E[pp^H], \quad (23)$$

$$w = \frac{R^{-1} a}{a^H R^{-1} a} \quad (24)$$

By obtaining q from Expression (25) below using the filter w obtained in this manner, beam forming processing is achieved.

[Math. 14]

$$q = w^H p \quad (25)$$

In the configuration shown in FIG. 9, the spectrum acquisition unit 108a acquires the frequency spectrum pi by subjecting signals observed in the microphones 1010 to AD conversion and performing frequency band division processing. Since the spectrum acquisition unit 108a has a similar function to the spectrum acquisition unit 102 in FIG. 8, the both may be configured integrally. The beam forming processing unit 108b performs computation processing of Expression (25). In addition, the beam forming coefficient calculation unit performs processing of calculating the filter w by Expression (23) and Expression (24).

According to the present embodiment as described above, it is possible to calculate the sound source position (mouth coordinates ($x_0$, $y_0$, $z_0$)) in the neck band type device 1000, and performance of various types of signal processing (in particular, beam forming through use of a steering vector) under the situation where there is a wearing displacement can be improved. In addition, even in the case where there are two microphones 1010, the sound source position (mouth coordinates) can be calculated. Further, it is possible to detect a wearing displacement with higher accuracy for notification to the user.

7. Adjustment of Inclination and Diameter of Neck Band Type Device

Next, setting of the angle θ and the diameter d of the neck band type device 1000 will be described. When calculating the mouth coordinates ($x_0$, $y_0$, $z_0$) of the user through the computations described above, it is desirable to prescribe the angle θ and the diameter d at predetermined values. FIG. 10 to FIG. 13 are schematic views showing configurations for bringing the angle θ and the diameter d into desired values. On the inner circumferential surface of the neck band type device 1000, an inclined surface (inclination adjustment unit) 1004 as shown in FIG. 11 is provided in a region A shown in FIG. 10. The inclined surface 1004 is brought into contact with the neck in the case where the neck band type device 1000 is worn around the neck of the user. Therefore, it is possible to set the angle θ at a desired value by setting the angle of the inclined surface 1004 at an optimum angle. Suitably, by placing a weight on the opening 1002 side of the neck band type device 1000, it is possible to reliably bring the inclined surface 1004 into contact with the neck of the user. It may be possible to mount an attachment including the inclined surface 1004 on the neck band type device 1000.

Figure 10:
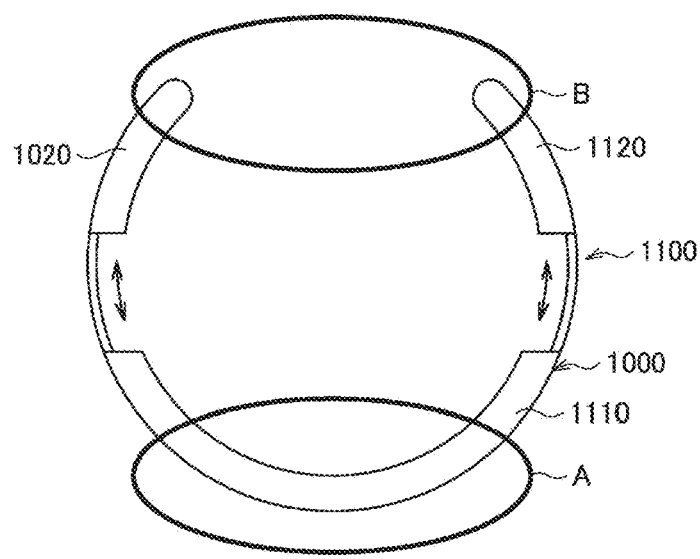
FIG. 10 is a schematic view showing a configuration for bringing an angle θ and a diameter d into desired values.
Figure 11:
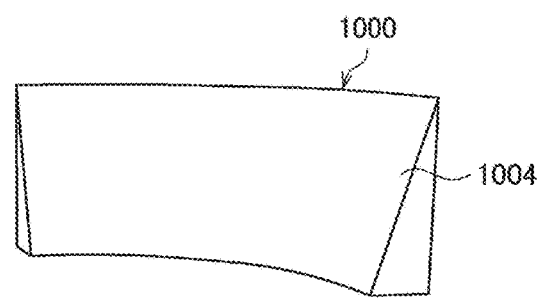
FIG. 11 is a schematic view showing a configuration for bringing an angle θ and a diameter d into desired values.
Figure 12:
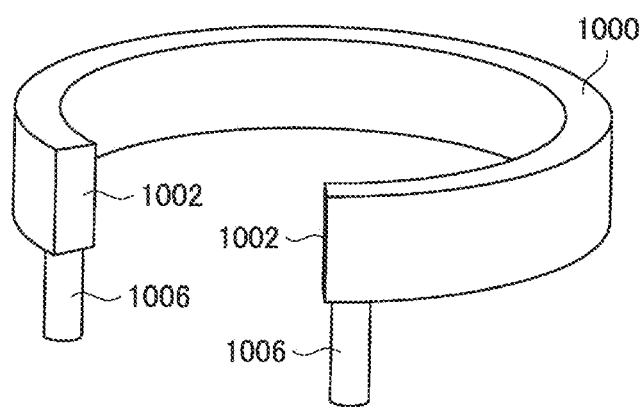
FIG. 12 is a schematic view showing a configuration for bringing an angle θ and a diameter d into desired values.
Figure 13:
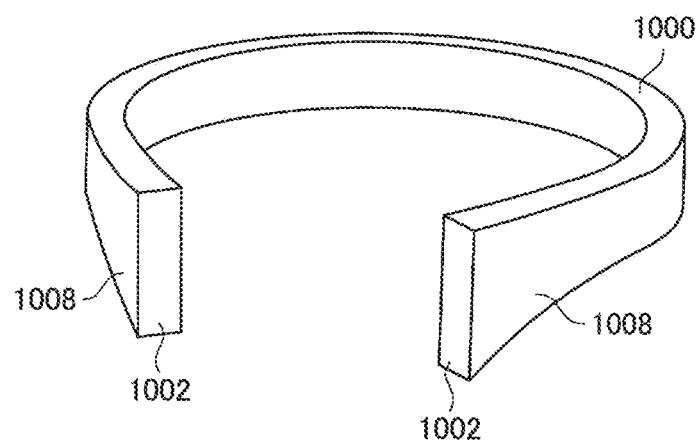
FIG. 13 is a schematic view showing a configuration for bringing an angle θ and a diameter d into desired values.

In addition, a member that sets the angle θ may be provided in a region B shown in FIG. 10. By providing the member in the vicinity of the opening 1002 of the neck band type device 1000 to place a weight on the front (the opening 1002 side) of the neck band type device 1000, it is possible to fill a gap between the body surface (around the collarbone) of a wearer and the enclosure of the neck band type device 1000 to fix the angle. FIG. 12 is a schematic view showing an example where projections (inclination adjustment units) 1006 are provided in the vicinity of the opening 1002 of the neck band type device 1000. In this configuration, in the case where the neck band type device 1000 is worn around the neck of the user, leading ends of the projections 1006 abut on the vicinity of the collarbone. Therefore, by setting the length of the projections 1006 at an optimum length, it is possible to set the angle θ at a desired value. In addition, FIG. 13 is a schematic view showing an example where an inclined part (inclination adjustment unit) 1008 whose thickness increases toward the front is provided instead of the projections 1006 in FIG. 12. In the configuration example of FIG. 13, by setting the length of the inclined part 1008 to the collarbone side at an optimum length, it is possible to set the angle θ at a desired value. It may be possible to mount an attachment including the projections 1006 or the inclined part 1008 on the neck band type device 1000.

As shown in FIG. 10, the neck band type device 1000 is provided with a slider (diameter adjustment unit) 1100, so that a front enclosure 1120 is slidable with respect to a rear enclosure 1110. Accordingly, by causing the front enclosure 1120 to slide with respect to the rear enclosure 1110, it is possible to set the diameter d of the neck band type device 1000 at a desired value. Note that, in the case of using a technique such as preparing a plurality of neck band type devices 1000 having different diameters d and selecting a neck band type device 1000 having a desired diameter d from among them, it is not necessary to provide the neck band type device 1000 with the slider 1100.

Note that setting of the angle θ and the diameter d by means of the inclined surface 1004, the projections 1006, the inclined part 1008, and the slider 1100 described above may be set previously in accordance with the size of the body (around the neck) of an average user, or the angle θ and the diameter d may be adjusted in accordance with an individual user by adjusting the inclined surface 1004, the projections 1006, the inclined part 1008, and the slider 1100 afterward.

According to the present embodiment as described above, it is possible to estimate the sound source position (position of the mouth of the user) in the neck band type device 1000 with high accuracy. Therefore, it is possible to perform various types of processing such as beam forming processing on the basis of the sound source position optimally.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A sound source position estimation device including:

a spectrum acquisition unit configured to acquire a frequency spectrum of a sound source on the basis of a sound obtained by a plurality of microphones provided for a ring-like wearable device;

a distance computing unit configured to compute respective distances from the plurality of microphones to the sound source on the basis of the frequency spectrum; and a sound source position computing unit configured to, approximating the ring-like wearable device to a circle and assuming that the sound source is located on a cylindrical surface including the ring-like wearable device, obtain an intersection between the cylindrical surface and spherical surfaces whose radii are the respective distances to compute a position of the sound source.

(2)

The sound source position estimation device according to (1), in which when computing the position of the sound source again after computing the position of the sound source, the sound source position computing unit computes the position of the sound source again by performing optimization computation assuming a distance from the circle on the cylindrical surface to the sound source as a fixed value.

(3)

The sound source position estimation device according to (1) or (2), in which the number of the microphones is two, and the sound source position computing unit obtains the intersection between the spherical surfaces and the cylindrical surface by simultaneously solving an expression expressing the cylindrical surface and two expressions expressing the spherical surfaces whose radii are the respective distances.

(4)

The sound source position estimation device according to (1) or (2), in which the number of the microphones is more than or equal to three, and the spectrum acquisition unit acquires the frequency spectrum through linear optimization.

(5)

The sound source position estimation device according to (1) or (2), in which the number of the microphones is more than or equal to three, and the sound source position computing unit computes the position of the sound source through nonlinear optimization on the basis of an expression expressing the cylindrical surface and expressions expressing the spherical surfaces whose radii are the respective distances.

(6)

The sound source position estimation device according to (5), in which the sound source position computing unit computes the position of the sound source through nonlinear optimization using the expression expressing the cylindrical surface as a restriction condition.

(7)

The sound source position estimation device according to (5), in which the sound source position computing unit computes the position of the sound source through nonlinear optimization considering an error included in the expression expressing the cylindrical surface due to approximation of the ring-like wearable device to the circle.

(8)

The sound source position estimation device according to (3), in which the microphones are provided at point symmetric positions with respect to a center of the circle, and the sound source position computing unit obtains an intersection between the spherical surfaces and the cylindrical surface using an expression expressing a relationship between the respective distances and a diameter of the circle instead of the expression expressing the cylindrical surface.

(9)

The sound source position estimation device according to any of (1) to (8), in which after computing the position of the sound source, the sound source position computing unit calculates the respective distances from the plurality of microphones to the sound source again on the basis of the computed position of the sound source and a position of each of the plurality of microphones.

(10)

The sound source position estimation device according to (9), in which beam forming processing is performed on the basis of the respective distances to the sound source calculated again by the sound source position computing unit.

(11)

The sound source position estimation device according to any of (1) to (10), in which
the spectrum acquisition unit acquires the frequency spectrum by subjecting a signal observed in the plurality of microphones to AD conversion and performing frequency band division processing.

(12)

A wearable device including:
an enclosure like a ring, provided with a plurality of microphones; and
a sound source position estimation device including
a spectrum acquisition unit configured to acquire a frequency spectrum of a sound source on the basis of a sound obtained by the plurality of microphones,
a distance computing unit configured to compute respective distances from the plurality of microphones to the sound source on the basis of the frequency spectrum, and
a sound source position computing unit configured to, approximating the enclosure to a circle and assuming that the sound source is located on a cylindrical surface including the enclosure, obtain an intersection between the cylindrical surface and spherical surfaces whose radii are the respective distances to compute a position of the sound source.

(13)

The wearable device according to (12), including:
an inclination adjustment unit configured to adjust an inclination of the enclosure with respect to a worn part of a body such that the sound source is located on the cylindrical surface.

(14)

The wearable device according to (12) or (13), including:
a diameter adjustment unit configured to adjust a diameter of the ring in the enclosure such that the sound source is located on the cylindrical surface.

REFERENCE SIGNS LIST 100 sound source position estimation device
102 spectrum acquisition unit
104 sound source distance computing unit
106 sound source position computing unit
1004, 1008 inclined part
1006 projection
1008 slider

The invention claimed is:

1. A sound source position estimation device comprising:
a spectrum acquisition unit configured to acquire a frequency spectrum of a sound source on a basis of a sound obtained by a plurality of microphones provided for a ring-like wearable device;
a distance computing unit configured to compute respective distances from the plurality of microphones to the sound source on a basis of the frequency spectrum; and
a sound source position computing unit configured to, approximating the ring-like wearable device to a circle and assuming that the sound source is located on a cylindrical surface including the ring-like wearable device, obtain an intersection between the cylindrical surface and spherical surfaces whose radii are the respective distances to compute a position of the sound source.

2. The sound source position estimation device according to claim 1, wherein
when computing the position of the sound source again after computing the position of the sound source, the sound source position computing unit computes the position of the sound source again by performing optimization computation assuming a distance from the circle on the cylindrical surface to the sound source as a fixed value.

3. The sound source position estimation device according to claim 1, wherein
a number of the microphones is two, and
the sound source position computing unit obtains the intersection between the spherical surfaces and the cylindrical surface by simultaneously solving an expression expressing the cylindrical surface and two expressions expressing the spherical surfaces whose radii are the respective distances.

4. The sound source position estimation device according to claim 1, wherein
a number of the microphones is more than or equal to three, and
the spectrum acquisition unit acquires the frequency spectrum through linear optimization.

5. The sound source position estimation device according to claim 1, wherein
a number of the microphones is more than or equal to three, and
the sound source position computing unit computes the position of the sound source through nonlinear optimization on a basis of an expression expressing the cylindrical surface and expressions expressing the spherical surfaces whose radii are the respective distances.

6. The sound source position estimation device according to claim 5, wherein
the sound source position computing unit computes the position of the sound source through nonlinear optimization using the expression expressing the cylindrical surface as a restriction condition.

7. The sound source position estimation device according to claim 5, wherein
the sound source position computing unit computes the position of the sound source through nonlinear optimization considering an error included in the expression expressing the cylindrical surface due to approximation of the ring-like wearable device to the circle.

8. The sound source position estimation device according to claim 3, wherein
the microphones are provided at point symmetric positions with respect to a center of the circle, and
the sound source position computing unit obtains an intersection between the spherical surfaces and the cylindrical surface using an expression expressing a relationship between the respective distances and a diameter of the circle instead of the expression expressing the cylindrical surface.

9. The sound source position estimation device according to claim 1, wherein
after computing the position of the sound source, the sound source position computing unit calculates the respective distances from the plurality of microphones to the sound source again on a basis of the computed position of the sound source and a position of each of the plurality of microphones.

10. The sound source position estimation device according to claim 9, wherein
beam forming processing is performed on a basis of the respective distances to the sound source calculated again by the sound source position computing unit.

11. The sound source position estimation device according to claim 1, wherein
the spectrum acquisition unit acquires the frequency spectrum by subjecting a signal observed in the plurality of microphones to AD conversion and performing frequency band division processing.

12. A wearable device comprising:
an enclosure like a ring, provided with a plurality of microphones; and
a sound source position estimation device including
a spectrum acquisition unit configured to acquire a frequency spectrum of a sound source on a basis of a sound obtained by the plurality of microphones,
a distance computing unit configured to compute respective distances from the plurality of microphones to the sound source on a basis of the frequency spectrum, and
a sound source position computing unit configured to, approximating the enclosure to a circle and assuming that the sound source is located on a cylindrical surface including the enclosure, obtain an intersection between the cylindrical surface and spherical surfaces whose radii are the respective distances to compute a position of the sound source.

13. The wearable device according to claim 12, comprising:
an inclination adjustment unit configured to adjust an inclination of the enclosure with respect to a worn part of a body such that the sound source is located on the cylindrical surface.

14. The wearable device according to claim 12, comprising:
a diameter adjustment unit configured to adjust a diameter of the ring in the enclosure such that the sound source is located on the cylindrical surface.

* * * * *